(No Model.)  2 Sheets—Sheet 1.

C. A. WORDEN.
RAZOR HOLDING AND ADJUSTING DEVICE FOR SHARPENING MACHINES.

No. 519,296. Patented May 1, 1894.

Witnesses
Percy C. Bowen
John C. Wilson

Inventor
Charles A. Worden,
by Whitman & Wilkinson,
Attorneys (No Model.) 2 Sheets—Sheet 2.

C. A. WORDEN.
RAZOR HOLDING AND ADJUSTING DEVICE FOR SHARPENING MACHINES.

No. 519,296. Patented May 1, 1894.

Witnesses
Percy C. Bowen
John A. Wilson

Inventor
Charles A. Worden,
by Whitman & Wilkinson,
Attorneys.

UNITED STATES PATENT OFFICE.

CHARLES A. WORDEN, OF THE UNITED STATES ARMY, ASSIGNOR TO THE WORDEN MACHINE COMPANY, OF OMAHA, NEBRASKA, AND NEW YORK, N. Y.

RAZOR HOLDING AND ADJUSTING DEVICE FOR SHARPENING-MACHINES.

SPECIFICATION forming part of Letters Patent No. 519,296, dated May 1, 1894.

Application filed February 23, 1894. Serial No. 501,233. (No model.)

*To all whom it may concern:*

Be it known that I, CHARLES A. WORDEN, a captain in the United States Army and a citizen of the United States, residing at New York, in the county of New York and State of New York, have invented certain new and useful Improvements in Razor Holding and Adjusting Devices for Use in Sharpening-Machines; and I do hereby declare the following to be a full, clear, and exact description of the invention, such as will enable others skilled in the art to which it appertains to make and use the same.

My invention relates to improvements in machines for sharpening razors and the like cutting implements, and especially to the devices used in adjusting and securing the implement in the machine.

My present invention relates particularly to certain improvements on the holding and adjusting devices shown in my Patent No. 487,140, dated November 29, 1892, and in my application filed December 26, 1893, Serial No. 495,024.

Reference is had to the accompanying drawings, wherein the same parts are indicated by the same letters throughout the several views.

Figure 1:
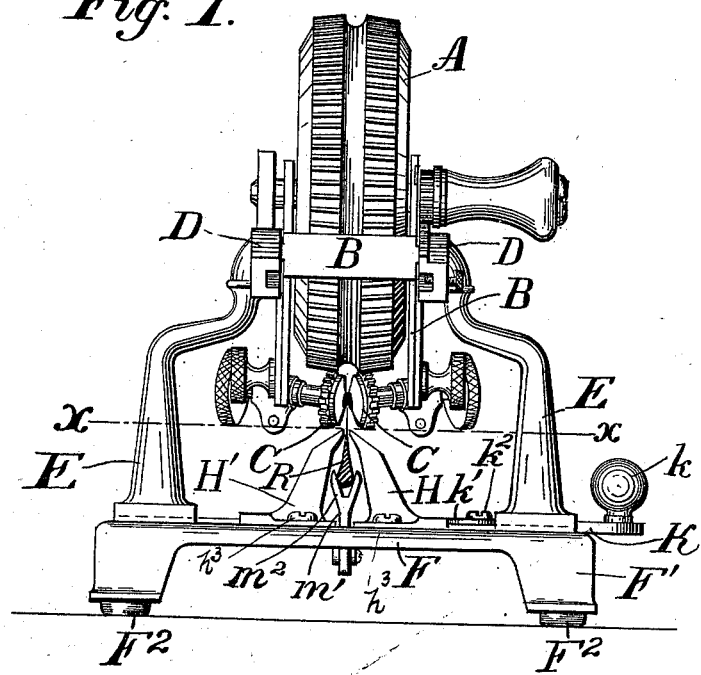
Figure 2:
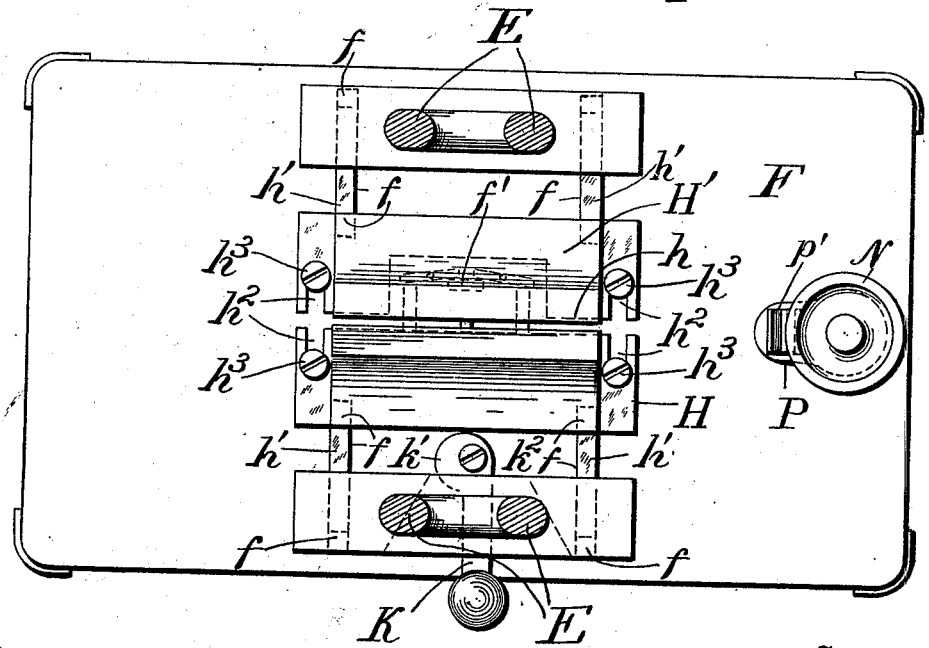
Figure 4:
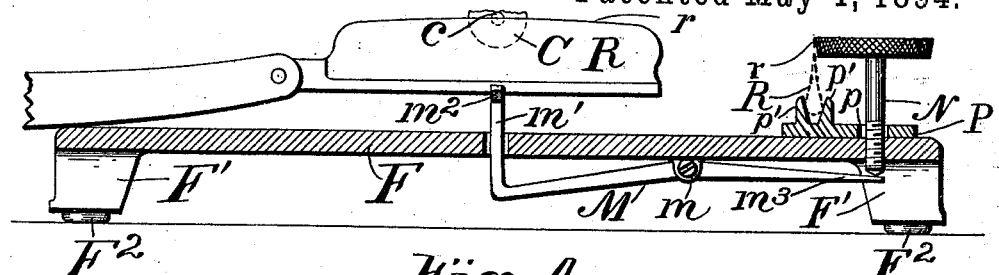
Figure 5:
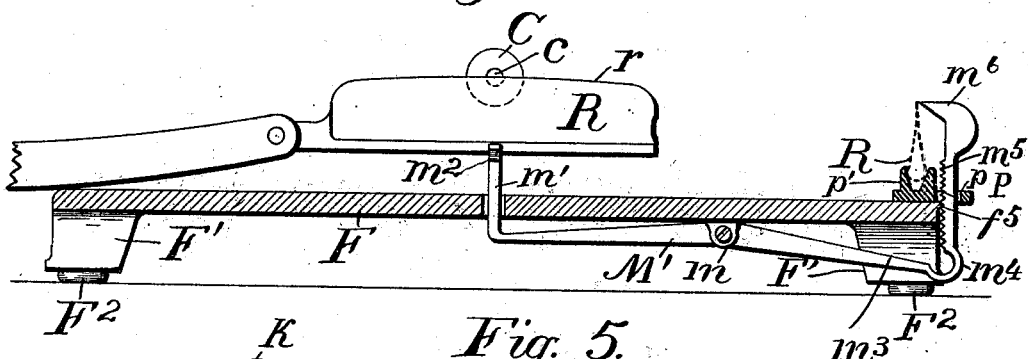
Figure 3:
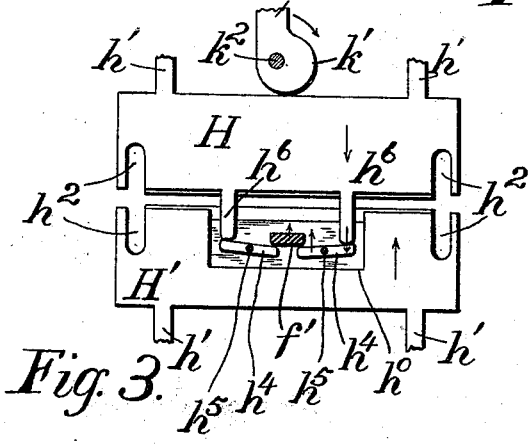
Figure 6:
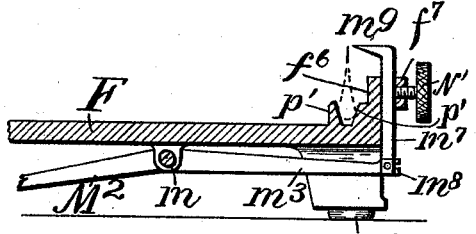
Figure 7:
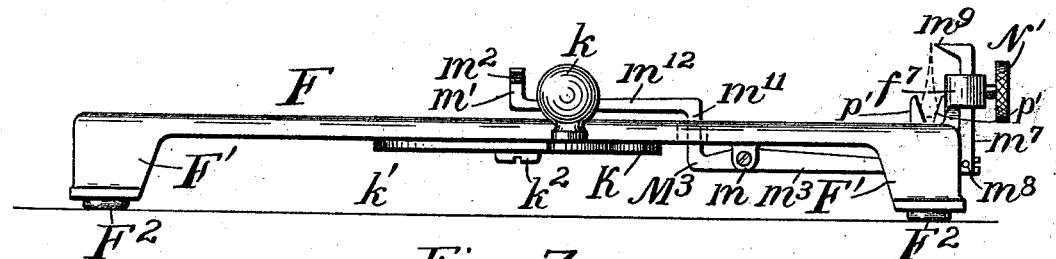

Figure 1 represents an end view of the machine shown in my patent and application aforesaid, and illustrates the improvements which will be hereinafter described. Fig. 2 represents a section along the line $xx$ of Fig. 1 and looking down. Fig. 3 represents an inverted plan view of the base of the clamp jaws parts being broken away. Fig. 4 represents a central longitudinal section of the device shown in Figs. 1 and 2. Fig. 5 represents a similar section to that shown in Fig. 4, with a modified form of holding device for the adjusting lever. Fig. 6 represents a sectional view similar to that shown in Figs. 4 and 5, of another method of clamping the adjusting lever, and Fig. 7 represents a side elevation of the base plate shown in my application, Serial No. 495,024, aforesaid, with the upper parts removed, and illustrates the method of applying the herein described adjusting lever to those machines manufactured in accordance with the specification forming part of said application.

A represents the driving wheel mounted in the carriage B carrying the revolving buttons C, the said carriage moves along the tracks D mounted on the stanchions E rigidly attached to the base plate F, which is mounted on the legs F' and small pads $F^2$.

The general arrangement of the parts A to F inclusive is fully described in my patent and application already referred to, and not forming part of my present invention will not be further described herein.

The base plate F is slotted as at $f$ to receive the lugs $h'$ of the sliding clamp jaws H and H' which are moved toward or away from each other in parallel lines, as will be hereinafter described. These jaws have straight holding edges $h$, and are mounted on flat bases slotted as at $h^2$ to receive the guide screws $h^3$, as shown in detail in Fig. 2. On the bottom of these flat bases a recess $h^0$ is cut out of one of the sliding jaws, into which a lug $f'$ (see Fig. 3,) projects. In this recess the double levers $h^4$ are pivoted as at $h^5$ and have their inner ends bearing on the said lug $f'$ and their outer ends bearing against the ends of lugs $h^6$ secured to the other sliding clamp jaw H.

K represents a cam lever provided with a handle or knob $k$, and carrying at its opposite end a cam $k'$, the cam lever being pivoted at $k^2$ in the base plate F. It will be obvious that if the cam be turned down in the direction of the arrow in Fig. 3, the sliding jaws H and H' will be pressed toward each other, while if the cam be turned in the opposite direction, the pressure on the jaws will be relieved, and they may be moved apart by hand. It will thus be seen that by a simple motion of the lever K the blade of the razor may be firmly clamped between the edges $h$ of the sliding jaws H and H'. In the patent and application already referred to, the interior of the jaws H and H' is lined with pads of felt or rubber preferably dentated to hold the razor firmly, and to set it at the desired height. Since it is important, for reasons fully given in the said patent that the edge of the blade of the razor shall about coincide with the cavity $c$ in the center of the conical buttons C, and since this adjustment is more or less difficult or inconvenient, with the pads between the holding jaws, I propose to do away with these pads, and to substitute in place thereof a Y-shaped vertically-adjustable holding arm, adapted to receive the back of the razor in the V-shaped groove at the top thereof, and to steady the same, maintaining the blade in a vertical position between the jaws. Moreover, if this holding arm be placed at or near the center of the back of the blade, the edge of the blade may be rapidly and conveniently adjusted so as to be in the path of the center of the revolving buttons. This holding arm $m^2$ may be made vertically adjustable in any desired way, but I have shown three such ways in Figs. 4 to 7 of the drawings.

In Fig. 4 the Y-shaped arm $M^2$ forms the upper end of a vertical arm $m'$ connected to or integral with the lever M which is pivoted at $m$ at the center of the said lever beneath the base plate F, and has its outer end $m^3$ pressed upon by the milled headed screw N.

By having the razor supported in the center of its back as shown in Fig. 4, and the center of the blade properly adjusted, the whole blade may be readily turned through a small angle about the pivot $m$, so that the whole extent of the edge will be in proper adjustment for sharpening.

The device shown in Fig. 5 differs from that shown in Fig. 4 only in the fact that the adjusting lever $M'$ is provided with a vertical arm dentated on its inner side as at $m^5$ the said dentations engaging a lug $f^5$ projecting from the edge of the base plate F.

In order to obtain sufficient resiliency, the metal lever $M'$ may be bent as shown at $m^4$, but this is not necessary, nor is the thumb lug $m^6$ which I preferably provide at the top of this arm.

In the form of device shown in Fig. 6, the end of the lever $M^2$ is slotted as shown at $m^8$, and a sliding bar $m^7$ terminating in a thumb lug $m^9$ is connected thereto. This sliding bar passes through a groove between the projection $f^6$ attached to the base plate F, and the lug $f^7$ screwthreaded to receive the clamp screw $N'$, which clamps the said bar at the desired height.

Since the mechanism may not be such as to admit the perforation of the base plate at its center as shown in Figs. 4 and 5, such for instance, as that shown in my application, Serial No. 495,024, it may become necessary to use a bent lever such as $M^3$ shown in Fig. 7, in which the said lever pivoted at or near its center as before, is bent upward as at $m^{11}$ passing through a suitable aperture in the base plate, and then extending longitudinally as at $m^{12}$ finally turning upward as at $m'$ to support the holder $m^2$. With this form of lever I have shown the adjusting device illustrated in Fig. 6, but any suitable device for adjusting the said lever may be adopted.

Since in all of the various adjusting devices herein described the adjusting lever is pivoted at or very near its center, it will be obvious that the vertical movement in one direction of the razor supporting end $m^2$ will be equal to the vertical movement of the opposite end adjusted as hereinbefore described. If therefore, a holding device having a V-shaped groove exactly the counterpart of the groove in the support $m^2$, be placed in juxtaposition to the device for moving said lever, it will be evident, first, that a given razor back would rest at the same depth in either of the V-shaped grooves and, second, that if a given razor R be adjusted in the support $m^2$, so as to have its edge $r$ in the proper position with regard to the cavity in the face of the button C, and then the same razor be moved with its center approximately over and resting in the V-shaped groove near the lever moving device, and a mark made on this device where the edge of the razor comes, then by simply placing a razor in this second V-shaped groove and moving the mark on the lever moving device to correspond with the edge of said razor, the support $m^2$ will be in exactly the proper position.

In practice instead of making the mark referred to, I prefer to cut off the top of the lever moving device where said mark would come as shown in Figs. 4 to 7.

In Fig. 4 the second support indicated by P is in the form of an oblong collar, perforated as at $p$, to allow the screw N to revolve freely thereon, and carrying on its upper surface two lugs $p'$, the groove between them being exactly the counterpart of the groove in the supporting device $m^2$. By cutting off the screw N so that when any given razor R is properly adjusted in the clamp $m^2$ its edge $r$ will just reach the top of the clamp screw, it will be seen that if any other razor be placed in the jaws $p'$, and the top of the adjusting screw be screwed down to correspond with the edge of the razor, then the support $m^2$ will be exactly in proper adjustment.

In Fig. 5 the top $m^6$ of the lever moving device is represented as cut off at the proper height above the jaws $p'$. In Figs. 6 and 7 these jaws $p'$ are made in a lug on the base plate F. This method of adjusting the proper position of the razor support $m^2$ without actually putting the razor in the machine is a matter of great convenience, as it is possible to quickly adjust the razor between the jaws $p'$, then to run the carriage B out of the way of the razor holder, H, clamp the razor in the holder, and begin work sharpening at once.

It will be seen that the V-shape of the groove in the support $m^2$ not only enables the razor to rest firmly in that groove but to be held firmly therein against lateral pressure.

It will be obvious that various modifications of the herein described devices might be made, which could be used without departing from the spirit of my invention.

Having thus described my invention, what I claim, and desire to secure by Letters Patent of the United States, is—

1. In a machine of the character described, the combination with a slotted base plate of two sliding jaws mounted on said base plate, one of the said jaws having a cavity in the base thereof, and the opposite jaws having lugs projecting into said cavity, of levers pivoted to the jaw in the cavity thereof, lugs on the opposite jaw adapted to bear against said levers, a projection on the base plate adapted to bear against the opposite ends of said levers, and means for pressing one of said jaws toward the other on said base plate, and so moving both jaws toward the closed position, substantially as and for the purposes described.

2. In a machine of the character described, the combination with a slotted base plate of two sliding jaws mounted on said base plate, one of the said jaws having a cavity in the base thereof, and the opposite jaws having lugs projecting into said cavity, of levers pivoted to the jaw in the cavity thereof, lugs on the opposite jaw adapted to bear against said levers, a projection on the base plate adapted to bear against the opposite ends of said levers, a cam mounted on said base plate and adapted to move one of said jaws, and a cam lever for operating said cam, substantially as and for the purposes described.

3. A razor holding and adjusting device for use in machines of the character described, consisting of means for nipping the sides of the razor blade, and a lever pivoted near its center and having an upwardly projecting arm adapted to hold the back of the razor blade, with an adjusting device near the opposite end of said lever, and equidistant with the razor supporting arm from said pivot, substantially as and for the purposes described.

4. A razor holding and adjusting device for use in machines of the character described, consisting of means for nipping the sides of the razor blade, and a lever pivoted near its center and having an upwardly projecting arm with a groove therein adapted to hold the back of the razor blade, with an adjusting device provided with a similar groove near the opposite end of said lever, and equidistant with the razor supporting arm from said pivot, and a device near said groove for moving said lever, substantially as and for the purposes described.

5. A razor holding and adjusting device for use in machines of the character described, consisting of means for nipping the sides of the razor blade, and a lever pivoted near its center and having an upwardly projecting arm with a groove therein adapted to hold the back of the razor blade, with an adjusting device provided with a similar groove near the opposite end of said lever, and equidistant with the razor supporting arm from said pivot, and a device near said groove for moving said lever, and projecting above said second groove the same distance that the opposite groove is below the center of the sharpening buttons, substantially as and for the purposes described.

In testimony whereof I affix my signature in presence of two witnesses.

CHARLES A. WORDEN.

Witnesses:
F. C. AYRES,
W. K. SCIPLE.